Dec. 6, 1966   J. A. RICHARDS   3,289,842
FEEDING OF SLURRY

Filed Feb. 12, 1963   3 Sheets-Sheet 3

INVENTOR.
JOHN A. RICHARDS
BY
ATTORNEYS

United States Patent Office 3,289,842
Patented Dec. 6, 1966

3,289,842
FEEDING OF SLURRY
John A. Richards, Seattle, Wash., assignor to Cascade Corporation, a corporation of Oregon
Filed Feb. 12, 1963, Ser. No. 258,045
13 Claims. (Cl. 210—138)

This invention relates to the feeding of slurry. The character of slurry with which the invention is especially concerned is composed of water and granular particles such as diatomaceous earth, and the feeder finds particular usefulness when employed in conjunction with a filter system in which the granular particles are deposited as a coating upon the exterior surface of filter septums.

In this type of filter system, a liquid which is to be filtered, as for example water drawn from a swimming pool, is pumped into a tank containing said coated septums. Foreign matter entrained in the pumped water is trapped by such coating as the water flows through the septum.

In coating the septums the procedure is to introduce the slurry to the pumped water at a point upstream from the filter tank. When a coating has become heavily faced with trapped foreign matter, so as to unduly restrict the water flow, the coating is removed for replacement purposes by the expedient of backwashing the filter septum.

During a filtering cycle it has become the preferred practice to first apply a rather thick coat of the filter medium to the septum. This is known as "pre-coating." Filtering then proceeds and, as foreign matter collects, additional applications of the filter medium are periodically made so as to be interspersed with the collected foreign matter and preclude the latter from matting into an impervious layer. This periodic supplementation of filter media, for lack of a better term, I will hereinafter refer to as "run-coating" the septums. Were the foreign matter, usually composed in large part of substances of a soft compressible nature and referred to within the industry as "garbage," to be permitted to build up in a single layer, namely without being interspersed with the media supplied in periodic run-coatings, the septum would become quickly clogged so as to require backwashing at much shorter intervals than is required when the deposited garbage is interspersed with diatomaceous earth or other filter medium.

The general object of the present invention is to provide a perfected machine and method for feeding slurry in at least two different concentrations and volumes, and such a machine and method as peculiarly adapts itself to pre-coating and run-coating the surface of filter septums.

This and other more particular objects and advantages will appear and be understood in the course of the following description and claims, the invention consisting in the new method of feeding the slurry and in the novel construction, adaptation and combination of the parts of a machine for performing said method, hereinafter described and claimed.

Figure 1:
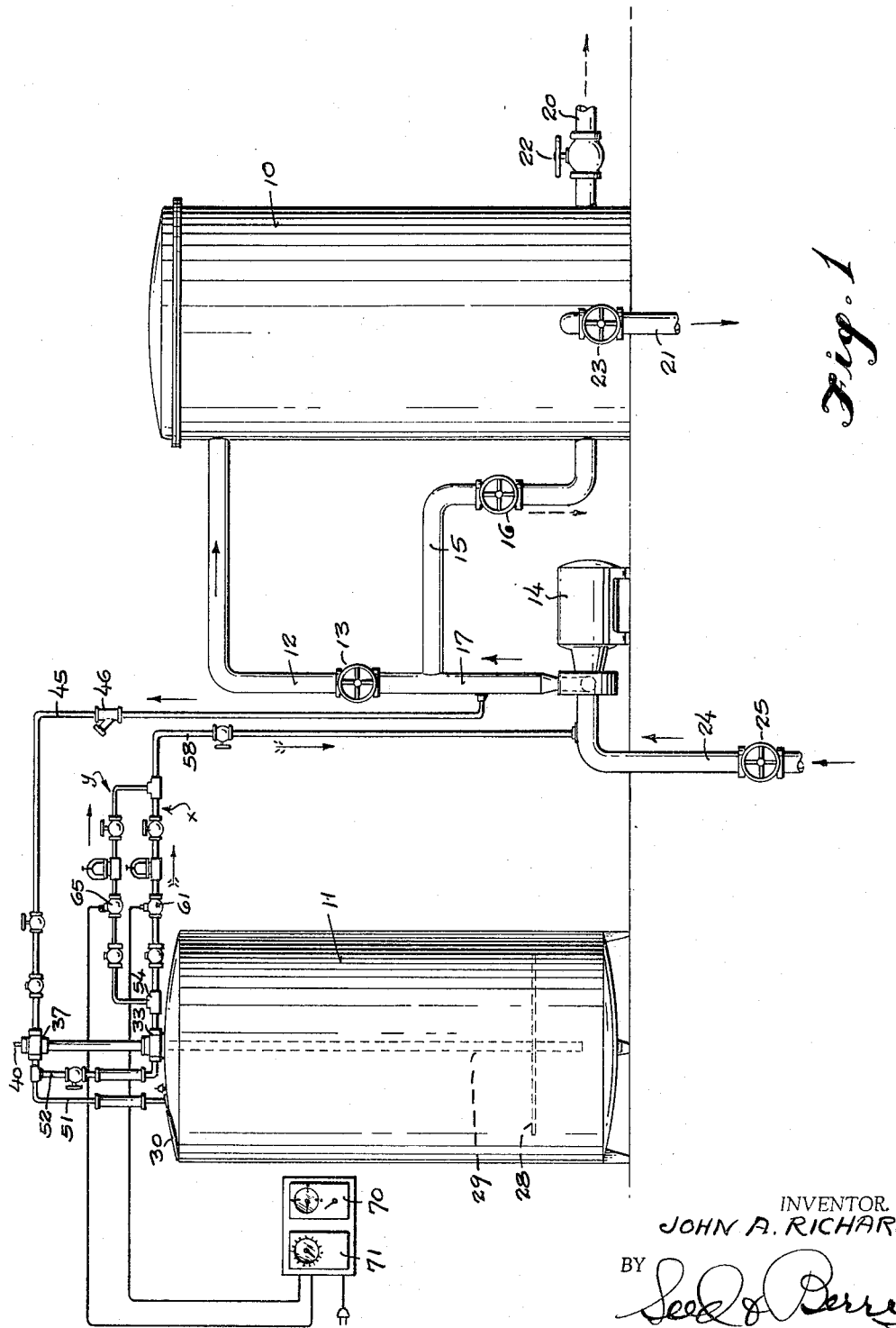
FIGURE 1 is an elevational view, schematic in part, illustrating a filter system embodying a slurry feeder constructed in accordance with the preferred teachings of the present invention. Feathered arrows in said view represent the flow path of slurry while solid-shafted and broken-shafted arrows indicate the flow-path of water in a filtering run and a backwashing run, respectively.
Figure 2:
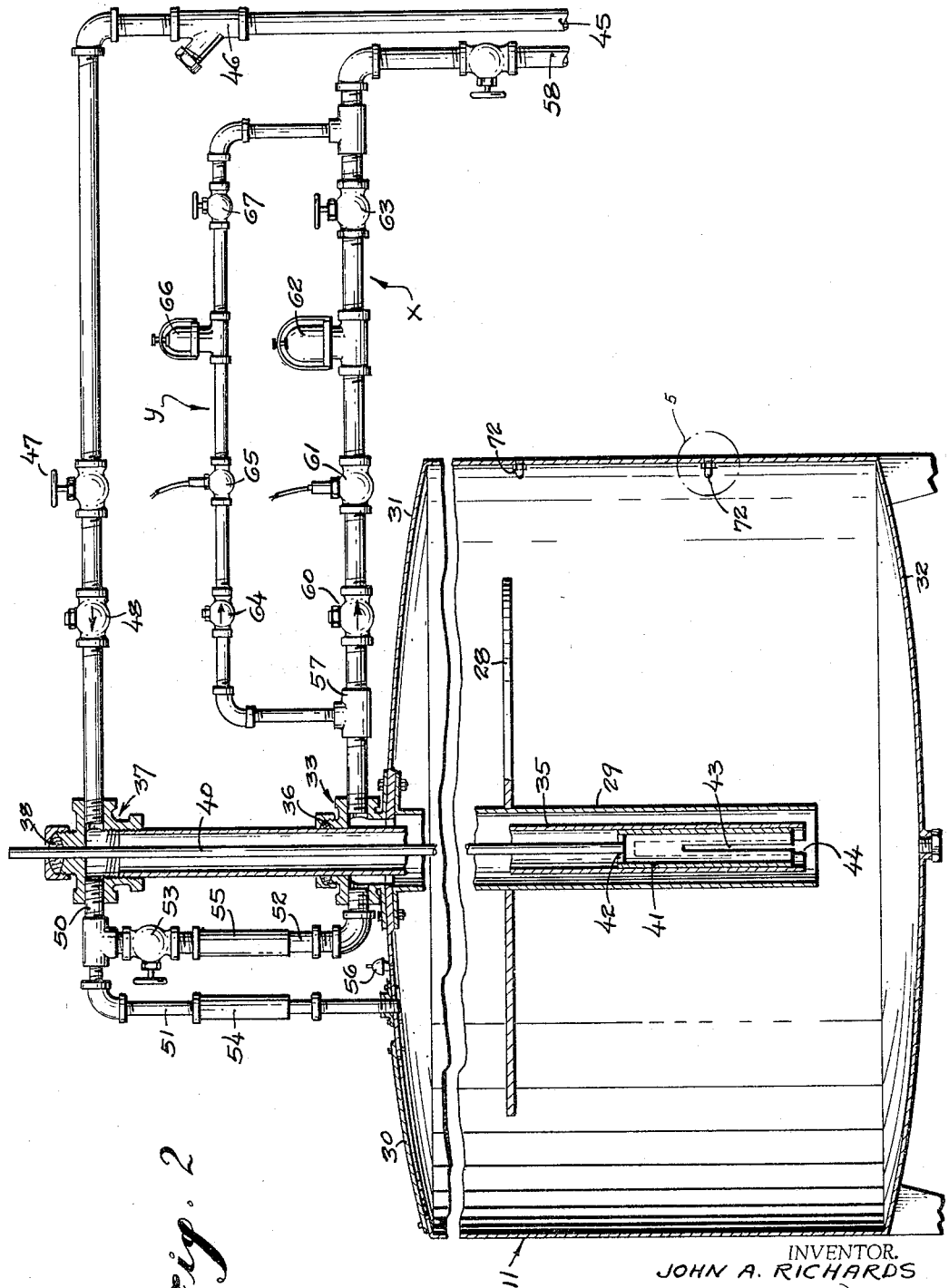
FIG. 2 is a fragmentary vertical sectional view of the feeder, with parts in elevation, and drawn to an enlarged scale.
Figure 3:
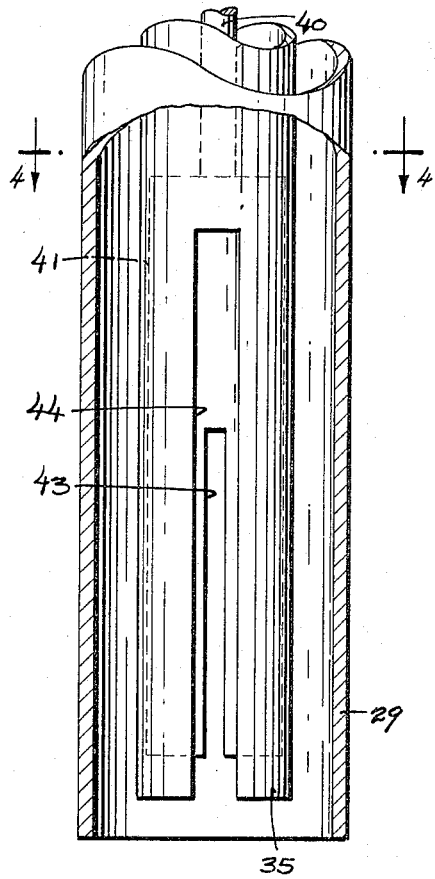
FIG. 3 is a fragmentary vertical sectional view drawn to a yet larger scale detailing the bottom end of a tube assembly which is provided within the slurry tank of the feeder, the vantage point being diametrically opposite from that of FIG. 2.

Referring first to FIG. 1 of said drawings, the numerals 10 and 11 designate two cylindrical tanks the former functioning as a filter tank and being like or similar, say, to the tank illustrated and described in my pending application for patent filed July 25, 1961, Ser. No. 126,587, now Patent No. 3,228,524 issued January 11, 1966, and the latter functioning as a slurry tank and having as its function to supply slurry into said filter tank so as to coat filter septums contained therein. The filter tank, as I have here elected to illustrate the same, has four valved pipes connected therewith. One normally open pipe 12 leads from the discharge side of a centrifugal pump 14 and connects directly with the interior of the tank at the head end of the latter. The shut-off valve therefor is denoted by 13. A second pipe 20 which likewise connects directly with the interior of the tank, albeit at the bottom end thereof, and which is fitted with a normally closed valve 22, extends to a dump point. The other two pipes 15 and 21 each lead through the wall of the tank and within the tank connect with a manifold which is in communication with the interiors of the contained septums (not shown). Pipe 21 is fitted with a normally open valve 23 and returns filtered water to the pool. Pipe 15 is fitted with a normally closed valve 16 and leads from a section 17 of the pipe 12 which lies between the valve 13 and the pump 14. The pool water to be filtered is fed to the suction side of the pump 14 through a pipe 24 fitted with a normally open valve 25.

Proceeding now to describe the slurry feeder, the tank 11 is a pressure-tight container and has a removable plate 30 in its head wall 31 for filling the tank with diatomaceous earth or other granular solid which is to be employed as the filter medium. From such head wall a slurry-emission tube 29 of moderately large diameter depends on the axial line of the tank to a point proximate to but spaced above the bottom wall 32. This tube is open at both ends and at its head end communicates with the interior of a cross-fitting 33 surmounting the tank. The emission tube has a large-diameter flat disc 28 fixedly secured thereto so as to occupy a horizontal plane spaced above the bottom end of the tube. The disc serves a baffle function. I find by experimentation that a diameter for the disc of approximately one-half the diameter of the tank, and a spacing above the bottom end of the emission tube of approximately one-half such disc diameter, are ideal for my purpose.

A pipe 35, functioning as a water admission tube, and having an outside diameter smaller than the inside diameter of the emission tube, has its head end received for endwise sliding adjustment through the gland of a stuffing box 36 which threads on the top of said cross. Open at both ends, the admission tube has its lower portion received within the emission tube and depends to substantially the bottom extreme of the latter.

Figure 4:
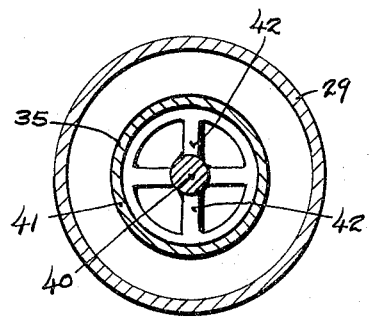
FIG. 4 is a horizontal sectional view on line 4—4 of FIG. 3.

The exposed upper end of the admission tube threads into the bottom opening of a second cross-fitting 37, and as with the cross 33 the top of the cross 37 has the gland of a stuffing box 38 threaded thereon. A rod 40 is received for endwise adjustment through said stuffing box, and depends through the hollow center of the admission tube to approximately the lower end of the latter. Threaded or otherwise securely connected to the lower end of the rod is the hub of a hollow core-piece 41 having a slide fit within the admission tube. The core-piece is open at the bottom and as can be best seen from an inspection of FIG. 4 has its hub attached by radial spokes 42 so that water flowing downwardly under pressure through the tube feeds to the hollow center of the core. While not detailed, means are provided holding the core against turning relative to the admission tube. Both the core and the admission tube provide registering vertical slots 43 and 44, respectively. The slot 44 is longer than the slot 43 and is designed to extend to a level well above the predetermined level to which the particular filter medium contained in the tank rises through the open bottoms of the recited pipe assembly under static conditions when water is not flowing through the admission tube.

Said water is delivered to the tube through a supply line 45 which connects with the cross 37, such supply line leading from the pressure pipe 12. Fitted in this supply line are a strainer 46, a manually operated regulating valve 47, and a check valve 48. A side line 50 extends from cross 37 by separate branches 51 and 52 one to the head end of the tank and the other to one of the two side openings of the lower cross 33. In compensation of the vertical adjustment to which the admission tube 35 admits, vertical sections of the two branch lines 51 and 52 are fitted with slip couplings 54 and 55. "Dresser" couplings are suitable for the purpose. An air relief valve 56 is provided for the tank.

The branch line 52 is fitted with a manually set regulating valve 53. Its function is to supply a stream of slurry-diluting water. The slurry to be diluted is of heavy consistency and rises through the emission tube into the cross 33 under force of the water introduced through the admission tube.

Issuing from the cross through the other of its two side openings, the diluted slurry passes by a T-fitting 57 into one or the other of two systems of flow-control pipes and thence is fed through a vertical tail pipe 58 into the main water line at the suction side of the pump 14. The two said systems of flow-control pipes are identical in their components and vary only as to size, each being fitted with a check valve, a solenoid valve, a sight glass, and a manually controlled set valve. For the major-flow system $x$ said components are denoted by 60, 61, 62 and 63, respectively. Those for the minor-flow system $y$ are denoted by 64, 65, 66 and 67, respectively. Two timers (see FIG. 1) are provided in the feeder to control the solenoid valves 61 and 65. The electric circuit which includes the solenoid for the valve 61 is made and broken by a timer 70, operated either automatically or by hand, and which is or may be of the spring-loaded manually re-set type. The timer 71 for the solenoid of the valve 65 is a clock-operated cycling timer caused to be started and stopped at periodic intervals.

Figure 5:
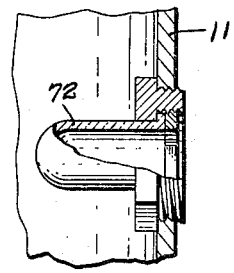
FIG. 5 is a fragmentary vertical sectional view detailing the view-port circled at "5" in FIG. 2.

The operation of the feeder is as follows:

The slurry tank is charged with diatomaceous earth and water. The dense earth settles and leaves a layer of clear water at the top. Bulb-type glass windows 72 (see FIG. 5) provided at spaced intervals of the height of the tank produce view-ports enabling the earth level within the tank to be visually determined.

As the tank is charged the earth is forced upwardly into the lower portion of the tube assembly, with the degree of rise determined by the physical and mechanical characteristics of the earth and the conveying water. In making the installation of the equipment the admission tube 35 and its core-piece 41 are positioned at such an adjusted setting as will insure that the upper end of the feed-way which the two registering slots 43 and 44 provide is above said level to which the earth rises.

To start the filter system functioning the valves 16 and 22 are closed, valves 25, 13 and 23 opened, and the motor for pump 14 energized to actuate the pump so as to draw water from the pool into pipe 24. With all of the manually set valves of the slurry-feeding system open (such valves being later regulated to obtain the desired flow rate), the operator starts the timers 70 and 71. Timer 70 opens solenoid valve 61 and holds the same open for a predetermined time interval. Timer 71, this being the cycling timer, opens and closes the solenoid valve 65 at periodic intervals and it is unimportant whether an open period occurs while valve 61 is open in that valve 67 is intended to have a setting which gives to the "$y$" system a flow capacity quite minor by comparison with the flow which the setting given to valve 63 prescribes for the "$x$" system. The garbage content of the fluid to be filtered serves as the guide in determining the frequency of timer 71's "on" intervals. The duration is such as will deposit a thin overlay of filter media upon the then-exposed foreign matter which has collected upon the filter septum.

A static pressure head is maintained upon the tank's earth content by the pipe 51. Responsive to an opening of either of said water-flow pipes $x$ or $y$, water flows from the supply pipe 45 through the dilution pipe 52 into the cross 33 and also downwardly through the water-admission tube 35 into the hollow core 41. The system operates on an erosion principle. The flowing water initially "eats away" at the granular particles which have risen into the open bottom of the tube assembly and hence clogged the bottom opening. The water flow from core 41 into the emission tube 29 is first rather restricted in that the same is limited to the flow capacity provided by the portion of the slot 43 which is exposed above the mouth-clogging earth. The eroded earth is entrained with the flowing water to produce a slurry. The flow, and perforce the slurry volume, increases as erosion proceeds. Erosion is quite rapid and the lower end of the tube assembly is shortly fully exposed and a more or less spherical pocket of swirling slurry encompasses such exposed end. The slurry rising through the slurry-emission tube is quite thick. Upon entering the cross this thick slurry is thinned by the dilution water fed through pipe 52, and such diluted slurry then flows to the suction pipe 24 through either the pipe $x$ or the pipe $y$, depending upon which of the two solenoid valves are open. Should the solenoid valve 61 be open, as is provided immediately after cleaning the filter tank, the flow of slurry is caused to be heavy and the filter septums are in consequence rapidly covered with a layer of filter medium. This is commonly known as "pre-coating." Should the solenoid valve 65 be open, as occurs periodically during filtering runs, a light slurry of media is fed into the suction pipe 24 to be picked up by the influent stream and deposited upon the filter septums. As previously pointed out, the purpose in depositing stratums of filter media is to preclude garbage separated from the stream by the filters from being laid down in such a close-packed condition as to produce a mat which is impervious, or which is sufficiently close to being impervious as to materially impede the water flow through the filter bed. The beneficial result is to greatly increase the time duration of a filtering run. It will perforce be understood that the operation of the timer 70, as well as the timer 71, can be made fully automatic, as can the operation of opening and closing valves 13, 16, 22 and 23. Various systemizing procedures resorting to pressure conditions obtaining in the filter tank and/or clocks to make filter runs and backwash runs automatic are well known in the industry.

The function of the baffle 28 is to preclude water channeling from the head end of the slurry tank along the length of the tube 29. Reaching the baffle such channeling water is diverted to a horizontal path and the granular particles then instantly drop from above so as to fill the channel. The tank is recharged with filter media when the view-ports 72 indicate that the media level has reached the horizontal plane occupied by the baffle.

Were the system to be so engineered as, for example, by raising the cross 33 to such a height (elevated above the slurry tank) that the run from such cross to the tail pipe 58 could be steeply inclined, the two horizontal flow lines x and y could feasibly be replaced by a single flow-control valve having two open positions, one a partial opening and the other a full opening. Settling within any horizontal length of piping is a problem not present in vertical piping. Feeding horizontally it becomes important to create a high-velocity travel through the several fittings. Reducing the size of the pipe and fittings in the line y perforce gives to the lesser volume of flow which is prescribed by the valve 67 a speed of travel comparable to that of the greater volume of flow prescribed by the valve 63. The color condition of the flowing slurry, as viewed through the sight glasses 62 and 66, permit the valves 47, 53, 63 and 67 to be each accurately set.

In the present system the volume of solid filter media fed during a given period of time can be controlled in other ways. It can be accomplished by employing a cycling timer 71 which admits of being pre-set by the operator for any variation of "on-off" time within the cycling period of the timer. The pre-coat timer 70 does not cycle but can be also pre-set for any interval.

Both pre-coat and run-coat feeding can be modified, in a degree which corresponds as between the two, by regulating the dilution valve 53.

Another means of changing feed rate which affects both the pre-coat feeding and the run-coat feeding similarly is to raise or lower the water-ingress tube, at the same time lowering and raising the core-piece 41 as a compensating means of producing the proper length of slot exposure. Raising such tube 35 produces a thinner slurry. Lowering the tube produces a thicker slurry. However, this adjustment has limits. If lowered too far the slot, even with the core-piece raised to the maximum of its effective adjustment, may become covered when the system is static and plug the system. If raised too high agitation may be confined to the interior of the emission tube and only a minimal amout of solids are then picked up by the flowing stream.

It is thought that the invention and the manner of its operation will have been clearly understood from the foregoing detailed description of my now-preferred illustrated embodiment. Changes in the details of construction my be resorted to without departing from the spirit of the invention and it is accordingly my intention that no limitations be implied and that the hereto annexed claims be given the broadest interpretation to which the employed language fairly admits.

What I claim is:

1. In combination with a filter system having a filter tank and an ingress pipe through which a stream of liquid to be filtered is fed under the pressure influence of a pump to filter septums which are contained in the filter tank and are coated by the solid content of a slurry, a slurry tank containing a supply of said solid content, a side outlet leading to the slurry tank from the ingress pipe at a point thereon placed upstream from the filter tank and at the pressure side of the pump, a return connection leading from the slurry tank back to the ingress pipe at a point on the latter placed upstream from the filter tank and on the suction side of the pump, means within the slurry tank operating when liquid is supplied through the side outlet into the slurry tank to channel the supplied liquid into the return connection while causing said channeled liquid to continuously erode and entrain from within the slurry tank a sufficient quantity of said solid content to produce a thick slurry, a pipe operatively associated with the return connection for supplying into the latter a slurry-diluting stream of liquid drawn from the side outlet, normally closed valve means operable when open to prescribe for said return connection either a major or a minor flow capacity, selectively, and control means for said flow-prescribing means acting initially to open the return connection to its major flow capacity for a moderately short time interval so as to charge pre-coating slurry through the return connection and then automatically at periodic intervals opening the return connection to its minor flow capacity so as to charge run-coating slurry through the return connection, the liquid within the ingress pipe and into which said diluted stream is fed being charged by the pump into the filter tank without interruption of its flow.

2. Structure according to claim 1, said supply of solid content comprising a granular mass, the side outlet providing an egress end for the supplied liquid and the return connection providing a communicating ingress end for the slurry, said egress and ingress ends being each buried in and exposed to the mass of granular material within the tank, means being provided maintaining at all times an open channel to establish said communication between said egress and ingress ends, the channel being exposed to the granular material within the tank.

3. A slurry feeder comprising, in combination: a tank adapted to contain a mass of granular material, an ingress tube for liquid and an egress tube for slurry leading downwardly to and upwardly from an erosion zone located within said mass adjacent the bottom end of the tank with the outlet end of the former and the inlet end of the latter each buried within and exposed to the mass of granular material in said tank, a pressure source of liquid supply feeding liquid under pressure through the ingress tube to said inlet end, a delivery pipe leading from the egress tube and fitted with a valve operating when closed to block the egress tube against issue of slurry, means for opening and closing said valve, and means being provided at the outlet end of the liquid-ingress tube maintaining at all times an open channel leading between said outlet end and the inlet end of the egress tube and exposed to the granular material within the tank.

4. A slurry feeder according to claim 3 in which the delivery pipe leads to a pipe through which a pressure stream of liquid is flowing from the source of liquid supply and charges slurry into said pressure stream, and wherein a connection is also provided from said pressure source of liquid supplying diluting liquid to the slurry as the latter is fed from the slurry-egress tube to the delivery pipe.

5. A slurry feeder comprising, in combination: a tank adapted to contain a mass of granular material, a juncture fitting surmounting the tank providing bottom, top and side openings, a vertical outer tube open at both ends having its upper end received in the bottom opening of said fitting and depending therefrom through the head wall of the tank with its lower end buried in the contained mass of granular material, a vertical inner tube of reduced diameter also open at both ends and disposed co-axially within said outer tube with its lower end depending to approximately the same level as the lower end of such outer tube and its upper end fitted through and projecting above the top opening of said juncture fitting, the lower end of said inner tube being vertically slotted to a height elevated somewhat above the bottom end of the outer tube, means for supplying liquid under a common pressure both to the upper end of the inner tube and to the head end of the tank, a delivery line for slurry connecting with a side opening of said juncture fitting, and a flow-governing control valve for said delivery line.

6. Structure according to claim 5, a plate being provided fixed to and surrounding the outer tube on a level elevated a moderate distance above the lower end to serve as a baffle interrupting liquid channeling from the head end of the tank downwardly along the outside of the tube.

7. Structure according to claim 5, means being provided for shifting the inner tube into positions vertically adjusted with respect to the outer tube.

8. Structure according to claim 5 having a hollow cylindrical core open at both ends fitted in the bottom end of the inner tube and having its lower end vertically slotted, the length of said core slot being less than that of the inner tube's slot and registering with the latter, means being provided for shifting the core into positions vertically adjusted with respect to the inner tube.

9. Structure according to claim 8 having an upper juncture fitting providing two side openings, a top opening, and a bottom opening, the upper end of the inner tube being received in the bottom opening of said upper fitting, an adjusting rod to which said core is attached extending upwardly through the inner tube and having its upper end received through and projecting above the top opening of said upper fitting, respective pipes being received in each of said two side openings with one of said pipes leading from the pressure source of liquid supply and the other of said pipes leading by two branches one to the head end of the tank and the other to a second side opening of the lower juncture fitting.

10. The structure of claim 5, said delivery line for slurry being divided into two parallel branches one of which has a major flow capacity and the other a minor flow capacity, independent flow-governing control valves being provided for each of said branches.

11. The structure of claim 10, means being provided operating to first open the control valve for the branch of greater flow capacity for a period of predetermined duration and thereafter periodically opening the control valve for the branch of lesser flow capacity for a respective period of predetermined duration.

12. In combination with a filter system having a filter tank and an ingress pipe through which a stream of liquid to be filtered is fed under the pressure influence of a pump to filter septums which are contained in the filter tank and are coated by the solid content of a slurry, a slurry tank containing a supply of said solid content, a side outlet leading to the slurry tank from the ingress pipe at a point thereon placed upstream from the filter tank and at the pressure side of the pump, a return connection leading from the slurry tank back to the ingress pipe at a point on the latter placed upstream from the filter tank and on the suction side of the pump, means within the slurry tank operating when liquid is supplied through the side outlet to channel a given portion thereof into the return connection while continuously eroding from within the tank and adding to said channeled liquid a sufficient quantity of said solid content to produce a thick slurry, a pipe operatively associated with the side outlet and the return connection for channeling into the latter a slurry-diluting stream of liquid drawn from the side outlet at a point thereon placed upstream from said means, a valve normally closing said return connection, and control means for the valve acting automatically at periodic intervals to open the valve for charging run-coating slurry through the return connection, the liquid within the ingress pipe and into which said diluted stream is fed being charged by the pump into the filter tank without interruption of its flow.

13. The method of feeding slurry composed of particulated matter entrained in a liquid carrier, comprising flowing a pressure stream of the carrier through connecting ingress and egress passageways which establish paths of travel leading first downwardly to and then upwardly from a point of juncture contained in and exposed to a mass of the particulated matter so that the stream acts by its flow to erode the particulated matter and produce within the mass adjacent said point of juncture a pocket of stream-borne whirling particles which continuously issues with the egress stream as a heavily concentrated slurry, at a ceiling point of said upward path of travel directing the slurry along a horizontal travel path, and at the approximate juncture of said upward and horizontal paths of travel introducing to the slurry a diluting pressure stream of the liquid.

References Cited by the Examiner

UNITED STATES PATENTS

| | | | |
|---|---|---|---|
| 2,661,244 | 12/1953 | Baily | 210—193 X |
| 2,934,241 | 4/1960 | Akesson | 222—193 X |
| 3,064,816 | 11/1962 | Griswold | 210—193 X |
| 3,199,677 | 8/1965 | Schneider | 210—193 X |

FOREIGN PATENTS 908,879  10/1962  Great Britain.

REUBEN FRIEDMAN, *Primary Examiner.*

SAMIH ZAHARNA, *Examiner.*